INVENTOR.
GEORGE T. SHIMABUKURO
BY Anthony D. Cennamo
ATTORNEY

Oct. 29, 1968 G. T. SHIMABUKURO 3,408,633

HIGH SPEED PRINTER SYSTEM

Filed Jan. 9, 1967 7 Sheets-Sheet 2

INVENTOR.
GEORGE T. SHIMABUKURO

BY Anthony D. Cennamo

ATTORNEY

INVENTOR.
GEORGE T. SHIMABUKURO
BY Anthony D. Cennamo
ATTORNEY

Oct. 29, 1968 G. T. SHIMABUKURO 3,408,633

HIGH SPEED PRINTER SYSTEM

Filed Jan. 3, 1967 7 Sheets-Sheet 4

INVENTOR.
GEORGE T. SHIMABUKURO

BY Anthony D. Cennamo

ATTORNEY

INVENTOR.
GEORGE T. SHIMABUKURO
BY
Anthony D. Cennamo
ATTORNEY

INVENTOR.
GEORGE T. SHIMABUKURO

BY Anthony D. Cennamo

ATTORNEY

INVENTOR.
GEORGE T. SHIMABUKURO
BY Anthony D. Cennamo
ATTORNEY

United States Patent Office 3,408,633

Patented Oct. 29, 1968

3,408,633

HIGH SPEED PRINTER SYSTEM

George T. Shimabukuro, Monterey Park, Calif., assignor to Xerox Corporation, Rochester, N.Y., a corporation of New York Filed Jan. 9, 1967, Ser. No. 608,156

7 Claims. (Cl. 340—172.5)

ABSTRACT OF THE DISCLOSURE

A high speed printer system wherein the recording zone is divided into a plurality of segments, each segment being itself subdivided into a plurality of columns and an endless character-bearing belt is moved through the recording zone. The position of each belt character is monitored relative to a reference point. As each character information is received, a binary number is determined as a function of the character's individual code, the position of the desired character on the belt relative to the reference point, and the segment column in which the character is to be recorded. This binary number is then stored and counted down as each belt character passes the reference point. When this number is reduced to zero, the particular printer actuator is enabled and the recording is effected.

This invention relates to high speed printer systems, and particularly to systems for recording information characters in a line-by-line mode.

*Background of the invention*

Relatively recent advances in the field of high speed electronic data processing machines have given rise to a need for reliable high speed output devices to convert the processed intelligence information in the form of electrical signals to visual indications of the results of the data processing operation.

In particular, there has been an ever increasing need in the art for high speed printing systems to rapidly convert the electrical output signals from the data processing machines to a printed record. One attempt at matching the high speed of the data processing machine has been a read-out device utilizing an endless belt bearing a particular character pattern, for example, the alphabet and other miscellaneous characters for punctuation, etc.

The electronic circuitry associated with this type of read-out device was of such a nature as to necessitate the storage of a complete line of information to be printed. As each character on the endless belt passed a print station, the storage was scanned to determine whether or not this character should be printed at the particular print station it was then passing.

In addition, if the flow of information to the read-out device was slow, an excessive delay would result before that information could be printed.

Another disadvantage of these prior art printing systems is that they require a great multiplication of electrical circuitry and components and are therefore almost prohibitively expensive.

Therefore it is an object of the present invention to improve high speed read-out from a data source without the aforementioned disadvantages of the prior art.

In addition, it is an object of the present invention to provide a high speed printing system which operates efficiently and at a high speed regardless of the speed of the data reception.

*Summary of the invention*

These and other objects of the invention are accomplished by dividing the recording zone into a plurality of segments, each segment being itself subdivided into a plurality of columns. As an endless belt rotates to move a pattern of characters successively through the recording zone, the position of each character relative to a reference point is monitored and a signal indicative thereof is generated for comparison with the desired segment and column in which the information character received is to be recorded. The combination of the particular segment and column as well as the belt character position is then combined to provide a binary number which will be reduced incrementally as the desired character on the belt approaches the appropriate record column and segment. When the belt character is at the appropriate recording position, a transducer will be activated to record this character on a suitable recording medium thereby providing a recording of the information character received by the recording system. A storage unit is utilized to record a plurality of binary numbers representing consecutive information characters received. This storage unit may be capable of storing slightly more binary numbers than columns in a segment.

*Brief description of the drawings*

For a better understanding of the invention, as well as other objects and features thereof, reference may be made to the following description of the invention to be read in connection with the accompanying drawings, wherein.

*Description of the preferred embodiment(s)*

Figure 1:
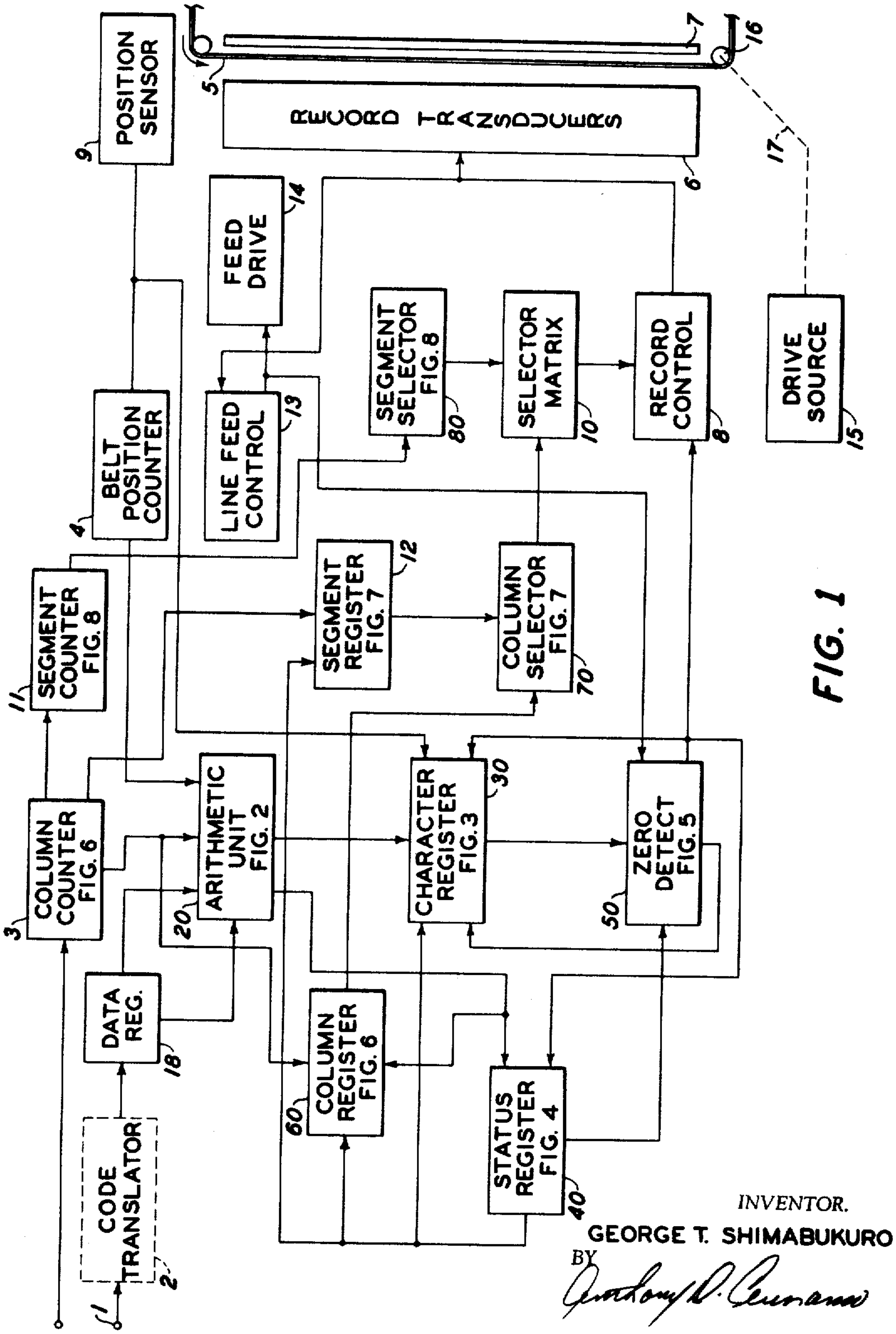
FIGURE 1 illustrates a block diagram of the high speed recording system in accordance with the present invention.

Reference is now made to the block diagram of a high speed recording system illustrated in FIGURE 1. Input data is applied to the recording system at input terminal 1.

This data may be derived from a variety of information sources, such as electronic computers, automatic data processors, magnetic storage units, central filing systems and telecommunication networks.

Whatever the source, this data may be in the form of serial binary bits, preferably six bits per information character to be recorded.

As is well known in the prior art, the binary data from the information source may also include additional bits in addition to the binary character information. For example, parity bits may be included as well as instructional information for the recording circuit illustrated in FIGURE 1. However, for purposes of this description it will be assumed that the input data at the terminal 1 consists of six serial binary bits representing each information character to be recorded.

A code translator 2 is connected to terminal 1 for implementing a code conversion operation which will be referred to in more detail hereinafter. The dashed box representing this code translator indicates that it is an optional component to the overall system as illustrated. This also will be explained in more detail hereinafter.

A binary information character is serially applied to a data register 18 from the input terminal 1. This register may consist of a conventional serial-to-parallel converter which generates a signal indicative of the completion of each conversion from serial binary character information to parallel binary character information. The signal so generated will be utilized to gate the parallel binary character signal into an arithmetic unit (AU) 20 as shown in FIGURE 1.

In addition to this parallel binary input from the data register 18, two other parallel binary inputs are provided to the arithmetic unit 20. One such input is from a column counter (COC) 3 which provides a binary signal which is a function of the number of columns of information which have been received by the high speed recording system from the information source.

Also, a belt position counter (BPC) 4 provides a parallel binary signal input to the arithmetic unit 20 indicative of the instantaneous position of a character bearing belt 5, shown partially in FIGURE 1 in cooperable relation with record transducers 6 and recording medium 7.

The recording medium 7 may take various forms depending upon the nature of the character bearing belt 5 and the record transducers generally designated by the reference numeral 6. For example, the recording medium may take the form of a xerographic member including a photoconductive layer supported by a conductive support layer. With such a recording medium, the character belt 5 may take the form of a transparent film which is translucent with the character configurations equally spaced thereon being opaque. The record transducers compatible with this particular character belt and recording medium could take the form of flash lamps, each lamp being in an array spaced parallel and closely adjacent to the moving character belt. Each lamp would represent a column in the record zone. For example, if a completely recorded line included eighty spaces for characters, then eighty equally spaced flash lamps would be required with the appropriate trigger circuits for these lamps. The selective triggering of these lamps, as well as any suitable record transducer, will be detailed hereinafter in connection with the remainder of the high speed recording system. Another example of a recording medium would be paper or an equivalent which would be compatible with impact printing techniques. In such a situation as this the character belt may take the form of a thin steel plate or the like having printing type units attached thereto in equally spaced relation with each other. These type units would each bear a different character and would be brought into contact with a suitable inked ribbon which may be interposed between the character belt 5 and the recording medium 7 by means of actuatable hammers. In general, the recording medium, the character belt, and the record transducers may be of any design so long as they are cooperable with each other to produce character recordings on the recording medium in response to electrical signals. For this reason, the recording medium, the record transducers, and the character belt are illustrated symbolically in FIGURE 1 since the particular design of these elements is conventional and does not in itself form a part of the present invention.

Whatever the nature of the character belt, it preferably has suitable indicators thereon associated with each of the characters on the belt. For example, each character on this belt may have an aperture associated therewith. This aperture would permit light from a fixed light source to fall upon a suitable photoelectric device as each character passes between the light source and the photoelectric device. In this manner, assuming that the first character in the series of characters on the belt are associated with a particular code, or binary number, the detection of the pulses of light as the character belt passes this light source will activate a conventional binary counter so that the instantaneous count registered by this counter corresponds with the code of that character presently disposed between the light source and the photoelectric device. For example, if the character pattern on the belt would be the alphabet in its normal order, then the character A would be associated with a binary number equivalent to the decimal number 1. Consequently, the character C or the third character would generate a binary number in the counter representative of the decimal number 3. In this manner by monitoring the binary number registered in this binary counter, it would be readily determinable what character is presently disposed at the light source and the photoelectric device.

From the above paragraph, it may be seen that each character on the character belt 5 is designated by a definite code number, e.g., $A=1$, $B=2$, etc. It is this code which must be identical to the character code used in the formation source. If the character code in the information source does not correspond with the same character code in the recording system of the present invention, then the code translator 2 may be utilized to alter the information source character code to be compatible with the character code used in the recording system of the present invention.

Accordingly, if the characters on the belt are coded in sequence, i.e., $A=1$, $B=2$, $C=3$, etc., and the number of such characters were known, then the instantaneous count registered in the counter would also be indicative of the position of other characters on the belt relative to the photoelectric device or a reference position. For example, if the counter indicates a count of four and the photoelectric device or reference position is at the character space through which the belt passes before immediately entering the recording zone, then it is known that the character A is in the third recording column in the recording zone.

In FIGURE 1, the photoelectric device is represented by the position sensor (PS) 9 and the binary counter would then be associated with the belt position counter 4 as shown in this figure. The capacity of the belt position counter would be at least sufficient to count the total number of different characters on the character belt 5. It is noted that in order to reduce the speed at which the character belt must move in order to provide high speed recording, a plurality of immediately successive character patterns may be made available on the moving belt 5. Whether there be one character pattern or several patterns on the character belt 5, additional indicator means are preferred at the termination of the particular character pattern on the belt. Such an additional indicator would be separately detected in order to reset the belt position counter 4 to zero to permit the counting anew of the characters as they pass the position sensor 9. By placing the position sensor at a predetermined position along the path through which the belt moves, a reference point can be established so that by an examination of the instantaneous count registered in the belt position counter, the position of every other character in the pattern will be known. For example, if the reference position of the position sensor is made to coincide with a point immediately preceding the first record position or column relative to the direction of belt motion, and if the count in the belt position counter is 25, the code for the character Y, then it is established that the first character in the character pattern, or in the example, the character A, is in the twenty-fourth column of the record zone. The count 25 in the belt position counter when the character belt contains a pattern of only 26 characters also indicates that the character A is two characters away from the first record column in the recording zone. This character A may be either in the same character pattern in which the aforementioned character Y was included or it may be in the next successive character pattern when a plurality of such patterns are made available on the character belt. It is noted that when a plurality of character patterns are used, it is preferable that there be no character space between successive patterns in order to avoid any unnecessary delays in presenting a character pattern to the recording zone.

The operations which the arithmetic unit 20 performs on the parallel binary inputs from the data register 18, the column counter 3, and the belt position counter 4 will be explained in more detail in connection with the discussion of the arithmetic unit illustrated in FIGURE 2. Suffice it to say at this point that the arithmetic unit will generate a binary number as a function of the desired information character to be recorded, the column position at which it is to be recorded on the recording medium 7, and the position relative to a reference position of the character on the character belt 5 corresponding to the character to be recorded.

Simultaneously with the generation of this binary number by the arithmetic unit 20, an appropriate gating pulse will be provided by the arithmetic unit, for example, at the input of a status register (STR) 40. The status register in response to this gating pulse will gate this binary number from the arithmetic unit 20 into a character register (CHR) 30. This character register will be referred to in more detail in connection with FIGURE 5.

Another input to the character register 30 is from the position sensor 9 and consists of a series of pulses, each one indicative of the passage of a character on the character belt passed the reference position. The effect of these pulses on the character register 30 and the binary number previously gated thereinto is to decrease this number by a decimal one for each character movement passed the reference position.

In this manner when this binary number in the character register 30 is reduced to zero, a zero detect circuit (ZD) 50 will sense this condition in the character register and generate an output signal to a record control circuit (RC) 8. Simultaneously with this generation of an output signal from the zero detect circuit 50, the character register 30 will be reset as well as the status register 40.

The record control circuit 8 serves a gating function which will be explained in more detail hereinafter and has, in addition to the input from the zero detect circuit 50, another input from a selector matrix (SM) 10. This selector matrix 10 is of a conventional design and may, for example, be a well known diode matrix.

The output from the selector matrix 10 is a signal indicative of the desired column in the record zone at which the information character represented by the binary signal or number previously in the character register 30 is associated. In this manner, the record control circuit 8 supplies an actuating signal to the appropriate record transducer to effect the recording of the desired character in the desired position or column in the record zone.

While the output signal from the selector matrix 10 is representative of a particular column in the record zone which, in the previous example, may be any one of eighty columns, it is actually indicative of any one of eight columns in any one of ten segments. It may be recalled that, in accordance with the concept of the present invention, the record zone is divided into ten segments, each of which is subdivided into eight columns. The information provided as inputs to the selector matrix 10 which enable it to select the desired column in the desired segment originate from a segment counter (SEC) 11 and the column counter (COC) 3. These counters will be referred to in more detail hereinafter in connection particularly with FIGURES 8 and 6.

It is only necessary in the discussion of the block diagram of FIGURE 1 to state that the segment counter 11 effectively counts one unit or segment for every eight columns counted by the column counter 3.

A segment selector (SES) 80 monitors the instantaneous count registered in the segment counter 11 and provides directly a segment input to the selector matrix 10. In this manner, during the receipt of the first eight columns of character information, the segment counter via the segment selector 80 energizes the first segment input of the selector matrix. As the first eight columns of information are completely received and recorded, the segment selector 80 will accordingly de-energize the first segment input to the matrix and energize the second segment input to the matrix 10. This operation of the segment selector will be qualified hereinafter when the details of the segment selector are discussed.

The other input to the selector matrix 10 is indicative of the particular column in that segment which has been selected by the segment counter 11 and segment selector 80 as outlined in the preceding paragraph.

Basically, the column register 60 receives in parallel a binary signal or number from the column counter 3 which is indicative of the particular column then registered in the column counter 3. This binary signal actually is gated into a particular section of the column register (COR) 60 simultaneously with the gating into the character register 30 of the binary number generated in the arithmetic unit 20 as already explained. This, it may be recalled, is performed by an output from the status register 40. Therefore, the column register 60 will store an instantaneous column count in the form of a binary number simultaneously with the storage of a binary number from the arithmetic unit 20 by the character register 30. This column, of which the column register storage is indicative, will be that particular column of the eight columns in a particular segment which corresponds with the information character presently stored in the character register 30.

Figure 7:
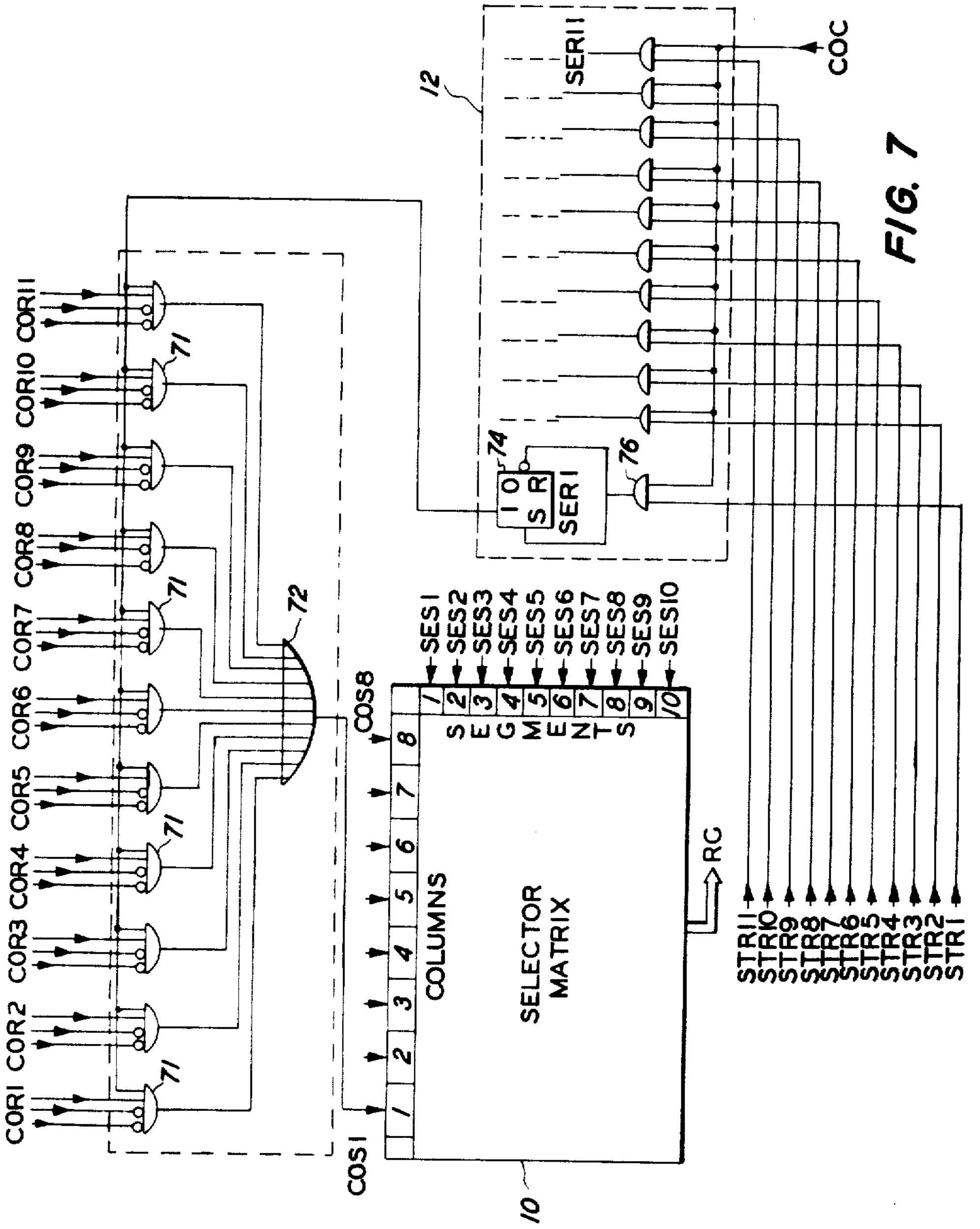
FIGURE 7 represents the schematic diagrams of the column selector (COS) and segment register (SER) and their relation to the selector matrix (SM) referred to in FIGURE 1 in accordance with the present invention.

A column selector circuit 70 then monitors the contents of the column register 60 as well as the contents of a segment register 12 which will be referred to in more detail in connection with FIGURE 7. It is sufficient to state that the segment register 12, while not actually monitoring or storing a particular segment count, does monitor a particular stage in the column counter 3 to produce an output signal indicative of whether or not the columns presently then being counted by the column counter are in a particular segment or an immediately preceding segment. This will be elaborated on in the discussion hereinafter in connection with FIGURE 7. At this point, it need only be understood that the segment register 12 provides an input to the column selector circuit 70 indicating whether or not the column information which the column selector 70 is monitoring from the column register 60 pertains to a segment then being recorded in the record zone or the next successive segment to be recorded. A detailed examination of this operation is beyond the scope of the discussion of the block diagram of FIGURE 1 and is reserved for the discussions hereinafter of the individual subsystems involved.

From the preceding paragraph, it may be understood that the output from the column selector circuit 70 and the segment selector circuit 80 will select one of ten segments and one of eight columns in the selected segment thereby producing an output signal indicative thereof to one input of the record control circuit 8. Upon the coincidence of this output signal at an input of the record control circuit and an output signal from the zero detect circuit 50 at another input of the record control circuit, a record signal or actuation signal will be translated to the appropriate record transducer to effect the recording of the desired character information in the desired position on the recording medium 7.

Also shown in block form in FIG. 1 is a line feed control circuit (LFC) 13 which may monitor the last eight record transducer inputs. Such a circuit may include a conventional counter to register the actuation of each monitored transducer. In this way, the line feed control circuit can detect when the last segment of columns have been recorded on the recording medium 7 and generate a signal indicative thereof. Such a signal will mean that all the record transducers associated with the last segment have been actuated thereby indicating that a complete line of characters has been recorded. The signal so generated is supplied to a feed drive circuit 14. This feed drive circuit 14 may be of any conventional design necessary to index a suitable recording medium after the complete recording of one line to provide the recording zone with an unrecorded area of the recording medium.

As will be explained in more detail hereinafter, the output from the feed drive circuit is also utilized to inhibit any recording during a line feed operation. This eliminates the possibility of a displaced character due to a transducer actuation during the actual movement of the recording medium between lines. To effect this, the output from the line feed control circuit is also supplied to this zero detect circuit 50.

As will be explained in more detail, the detection by the zero detect circuit 50 of a line feed operation effecting movement of the recording medium 7 will result in an alteration of the binary signal stored in the character register 30.

A conventional drive source 15 is also illustrated in FIG. 1 and may include suitable motor apparatus. The driving force of this motor apparatus is suitably coupled to a drive pulley 16 for example by mechanical linkage generally depicted in FIG. 1 by the dashed line 17. This drive source 15 may move the character belt through the record zone at a uniform rate.

Figure 2:
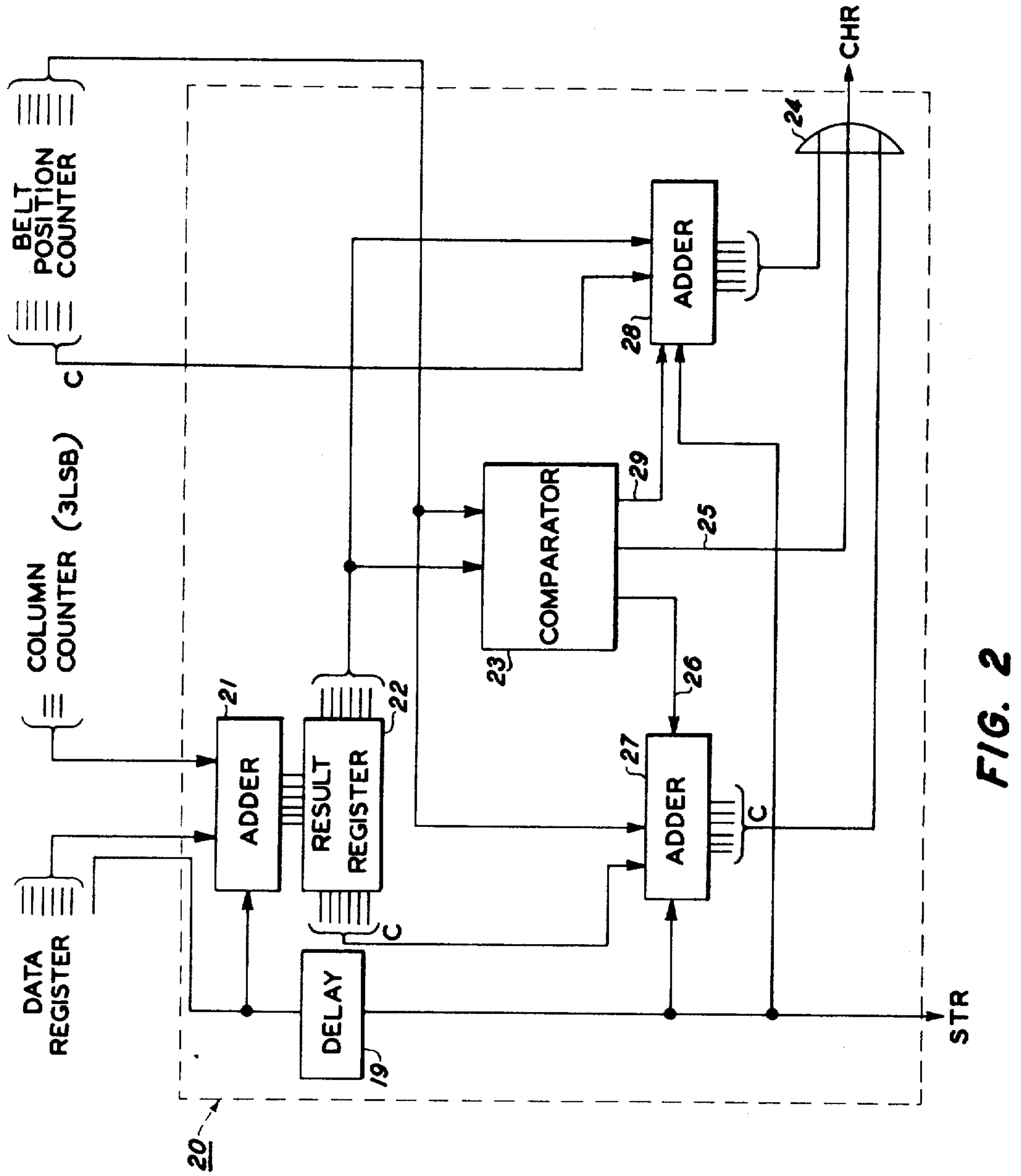
FIGURE 2 represents a block diagram of the arithmetic unit (AU) of FIGURE 1 in accordance with the present invention.

Reference will now be made to FIGURE 2 which illustrates in block diagram form the arithmetic unit 20 referred to hereinabove in connection with FIGURE 1. As previously noted in connection with FIGURE 1, the arithmetic unit 20 receives input signals from three subsystems within the high speed recording system illustrated in FIGURE 1. These inputs are shown in more detail in FIGURE 2 as actually five separate inputs.

The data register 18 is responsible for supplying two inputs to the arithmetic unit. One of these inputs is in the form of a binary signal gated in a parallel manner into a conventional adder circuit 21 in the arithmetic unit in response to another input from the data register, a gating pulse. This gating pulse is generated by the data register upon the completion of each conversion of the serial character information into parallel form. Substantially simultaneous with the aforementioned gating pulse, the adder circuit 21 adds the binary signal from the data register with a third input to the arithmetic unit, viz., the three least significant bits then stored in the column counter 3. In binary number theory, these three least significant bits are all the bits necessary to count from 0 to 7 or the number of columns, (i.e. 8), allocated to a segment.

Therefore essentially, the adder circuit 21 adds the binary coded signal of the desired information character to be recorded with the column in which it is to be recorded regardless of the particular segment in which this column will be located. In other words, if the data register provides a binary coded signal representative of the character R and this R is to be recorded in the third column of the fifth segment, or the fifty-first column of the eighty possible columns, the sum registered in the adder circuit 21 after the summation of the binary coded signal from the data register and the three least significant bits from the column counter will be the same for the character R whether or not it is to be recorded in the third column, first segment, or the third column, seventh segment.

The sum generated in the adder circuit 21 is stored in a result register 22 of conventional design which itself has two parallel outputs for monitoring either the binary number which it has registered or its complement. The complementary output is shown as coming from the left of the block as illustrated in FIGURE 2 and is designated by the letter C.

The last two inputs of the aforementioned five inputs to the arithmetic unit 20 as shown in FIGURE 2 originate at the belt position counter 4, referred to earlier in connection with FIGURE 1. These two inputs will provide a binary signal in parallel form indicative of the instantaneous count registered in the belt position counter 4. As noted above, this count represents the position of a character on the character belt 5 relative to a reference position preferably immediately prior to entry into the record zone of a high speed recording system of FIGURE 1. One of these inputs designated by the letter C represents the complement of the particular count registered in the belt position counter 4. The other input represents the actual count of this counter 4.

A comparator circuit 23 of conventional logic design compares the binary number of signal stored in the result register 22 with the count registered in the belt position counter 4 and provides three output signals, each indicative of a different comparison between these two binary signals.

The first output signal from the comparator circuit 23 represents the condition when the count registered in the belt position counter 4 is equal to the binary number registered in the result register 22. This output, indicated by the reference numeral 25, provides a direct input to an OR gate 24. This OR gate is directly connected to the character register 30 as aforementioned in connection with FIGURE 1.

It should be noted that this output 25 from the comparator 22 of FIGURE 2 is only symbolic to facilitate the description of the arithmetic unit 20. As may be understood hereinafter, the contents of the sections of the character register 30 are initially "zero." This initial condition obviously obviates a connection between this character register 30 and the comparator 23 for purposes of altering the contents of the character register to reflect the identity of the contents of the belt position counter 4 and the result register 22.

If the comparison between the contents of the result register 22 and the belt position counter 4 indicate that the former result register contents is greater than the contents of the belt position counter, an output signal indicative thereof will be translated via conductor 26 as a gating signal to another conventional adder circuit 27. Simultaneously with this gating signal from the comparator circuit 23, another gating signal will be provided to the adder circuit 27 from the data register 18 after a predetermined delay. This predetermined delay may be provided by a conventional delay circuit 19. This delayed gating signal originated upon the completion of each serial-to-parallel conversion in the data register 18. Upon the coincidence of these two gating signals in the adder circuit 27, the complement of the result register contents and the contents of the belt position counter will be summed and the complement of this summation will be translated in a parallel manner to the OR gate 24.

When the comparison in the comparator circuit 23 is such as outlined in the preceding paragraph, i.e., the belt position counter contents is less than the contents of the result register 22, this indicates a condition in which a character on the character belt 5 corresponding to the desired information character to be recorded at the time of receipt of the information character by the high speed recording system has not yet passed the desired column in which it is to be recorded. In this situation then, the binary number generated by the adder circuit 27 represents the amount of characters which must pass the reference position prior to the record zone before the desired character on the character belt 5 is at the desired record column. For example, if the third letter of the character pattern is desired to be recorded in the sixth column of the first segment and the belt position counter indicates that the second character in the character pattern on the character belt 5 is at the reference position, the number which will be translated to the OR gate 24 will be seven which represents the complement of fifty-six or the difference between the contents of the result register 22 and the belt position counter 4. It may be observed that this number seven also represents the number of characters or character spaces through which the desired character to be recorded must pass before reaching the sixth column of the first segment of the record zone.

If the comparison made in the comparator circuit 23 indicates a situation contrary to that outlined in the preceding paragraph such that the contents of the belt position counter is greater than the contents of the result register 22, then an output indicative of this comparison is translated in the form of a gating pulse to adder circuit 28 via conductor 29. Also providing a gating pulse to this adder circuit 28 is the delay circuit 19. Upon the coincidence of these two gating signals in the adder circuit 28, the complement of the contents of the belt position counter are added to the contents of the result register. This summation is provided as a parallel input to the OR gate 24 as was the output from the adder circuit 27.

When the contents of the belt position counter 4 is greater than the contents of the result register 22, a character on the character belt 5 which corresponds to the desired character to be recorded has at the instant of receipt of the information character by the high speed recording system already passed the desired column in the record zone in which it is to be recorded. Therefore, the character belt must continue to pass all the remaining characters through the reference position to position the beginning of the character pattern thereat. In addition, the character belt must then move so as to move the desired character on the belt into the record zone and position it at the desired column. It may be observed that the summation of the character code or number and the desired column number (the contents of the result register) as well as the complement of the contents of the belt position counter will provide a number representative of those character spaces intermediate the desired column in the record zone and the desired character on the character belt 5.

All the above references to the arithmetic unit and the desired column in which an information character is to be recorded have been made with the assumption that there is only one segment, and it is immediately following the reference position. It will be seen hereinafter that the arithmetic unit need not include a determination of which segment the indicated column or desired column is located. This will be provided for with additional logic circuitry as described hereinafter.

It should be noted at this point that for the sake of simplicity the drawing of the arithmetic unit 20 shows the output from the OR gate 24 as well as its inputs as single conductors. However, it should be remembered that each of these single conductors symbolically represents a parallel output of six individual conductors.

Further, it can be understood that the OR gate 24 symbolically represents six OR gates, each of which gates respectively the individual outputs from the adder circuit 27 and the adder circuit 28 thereby providing six outputs which, as was noted in FIGURE 1, are available for gating into the character register 30.

The operation that is performed by the arithmetic unit is dependent upon the base of the number system that is employed. For example, in the preferred embodiment, the columns 1 through 8 of each segment will be binarily represented by 000 through 111. Therefore, when the column counter is added to the character register, appropriate correction for the number base must be made. However, the system as described will not depend upon the number system.

Figure 6:
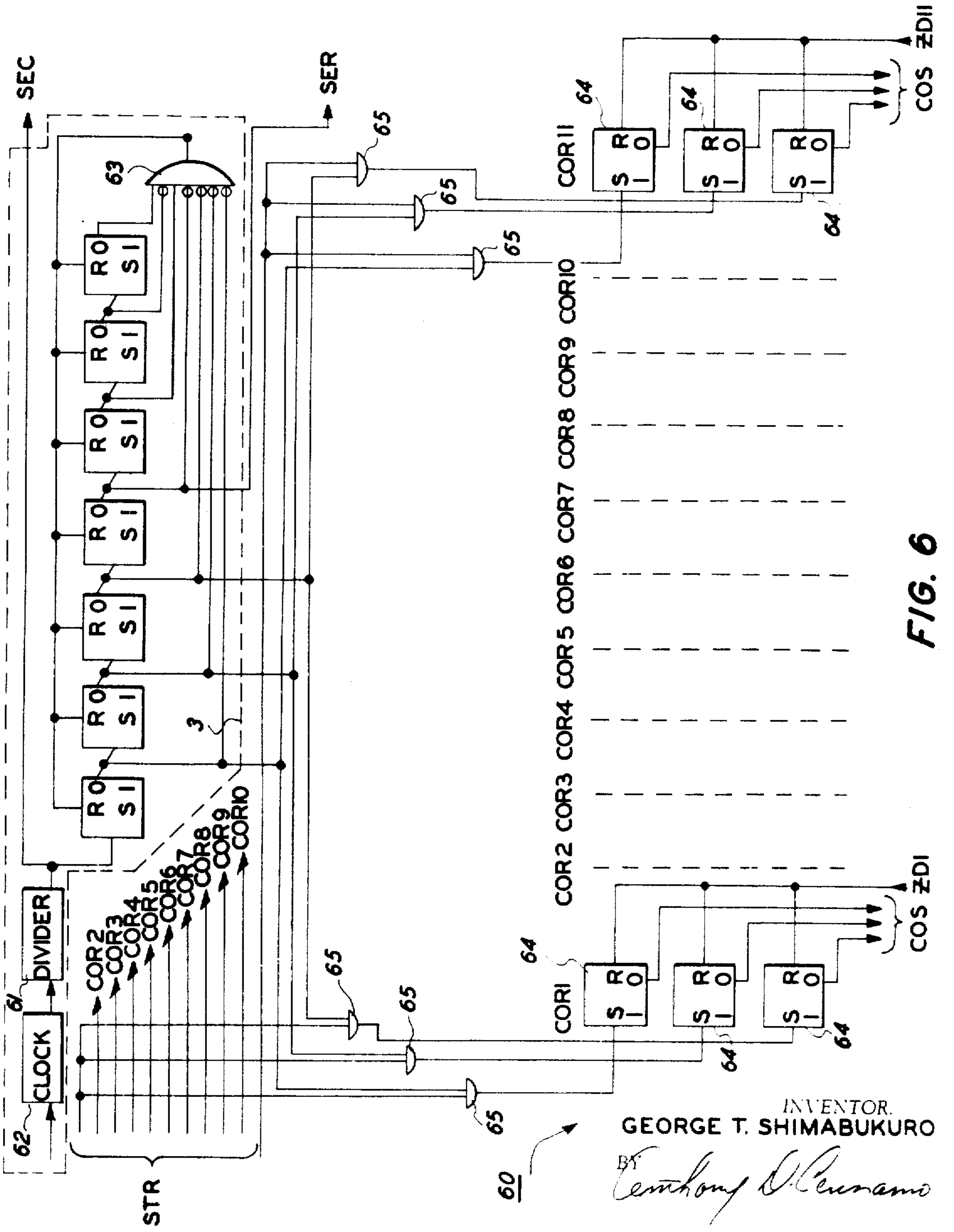
FIGURE 6 is a partial schematic diagram of the column counter (COC) and column register (COR) referred to in FIGURE 1 in accordance with the present invention.

The character register 30 referred to above in the discussion of FIG. 1 is shown in partial schematic form in FIG. 3 to which reference will now be made. Character register 30 may comprise eleven sections, designated for purposes of convenience as CHR 1 through CHR 11, each section including six conventional flip-flops 31 in cascade relation with each other as shown in detailed section CHR 1. Each section can be loaded in parallel through OR gates 32 and AND gates 33. One input of the AND gate 33 is one bit of the binary number generated as a result of the operation of the arithmetic unit 20 as hereinabove described. The other input to these AND gates 33 originates from respective sections of the status register 40 referred to hereinabove in connection with the block diagram of FIG. 1. Each character register section is associated, as will be described hereinafter, with a respective section of the status register 40. For example, the second input of the AND gates 33 of the CHR 1 section of the character register 30 come from the STR 1 section of the status register 40. The other sections of the status register 40 provide like inputs to the AND gates 33 of the other sections of the character register 30 accordingly. Similarly, one of the inputs of the AND gates 33 in the remaining sections of the character register 30 are supplied by the output from the arithmetic unit 20 representing a bit of the six bit binary signal generated thereby. As noted in detail in section CHR 1 of the character register 30, all sections of the character register are provided with an input from the position sensor 9 also referred to in connection with the block diagram of FIG. 1. This input to the sections is such as to selectively count down the number loaded into the sections by one unit for each character detected passing the reference position. The two other inputs to the character register are from the zero detect circuit 50 also noted in the description of FIG. 1. The function of these two inputs will be referred to in more detail in connection with the zero detect circuit which is illustrated in FIG. 6. Similarly, the single output from the character register which is to the zero detect circuit 50 will also be detailed in connection with the discussion of FIG. 6.

Therefore, it can be understood from the above discussion of the CHR 1 section of the character register that, depending upon the gate signal from the status register 40, a six bit binary number, for example, from the arithmetic unit will be loaded into one of the sections of the character register. This number will then be counted down as the position sensor detects individual characters passing the reference position. It is readily seen that at some point in time the contents of this particular section of the character register will reach zero. The consequence of this condition will be pursued in the discussion of the zero detect circuit illustrated in FIG. 6.

Figure 4:
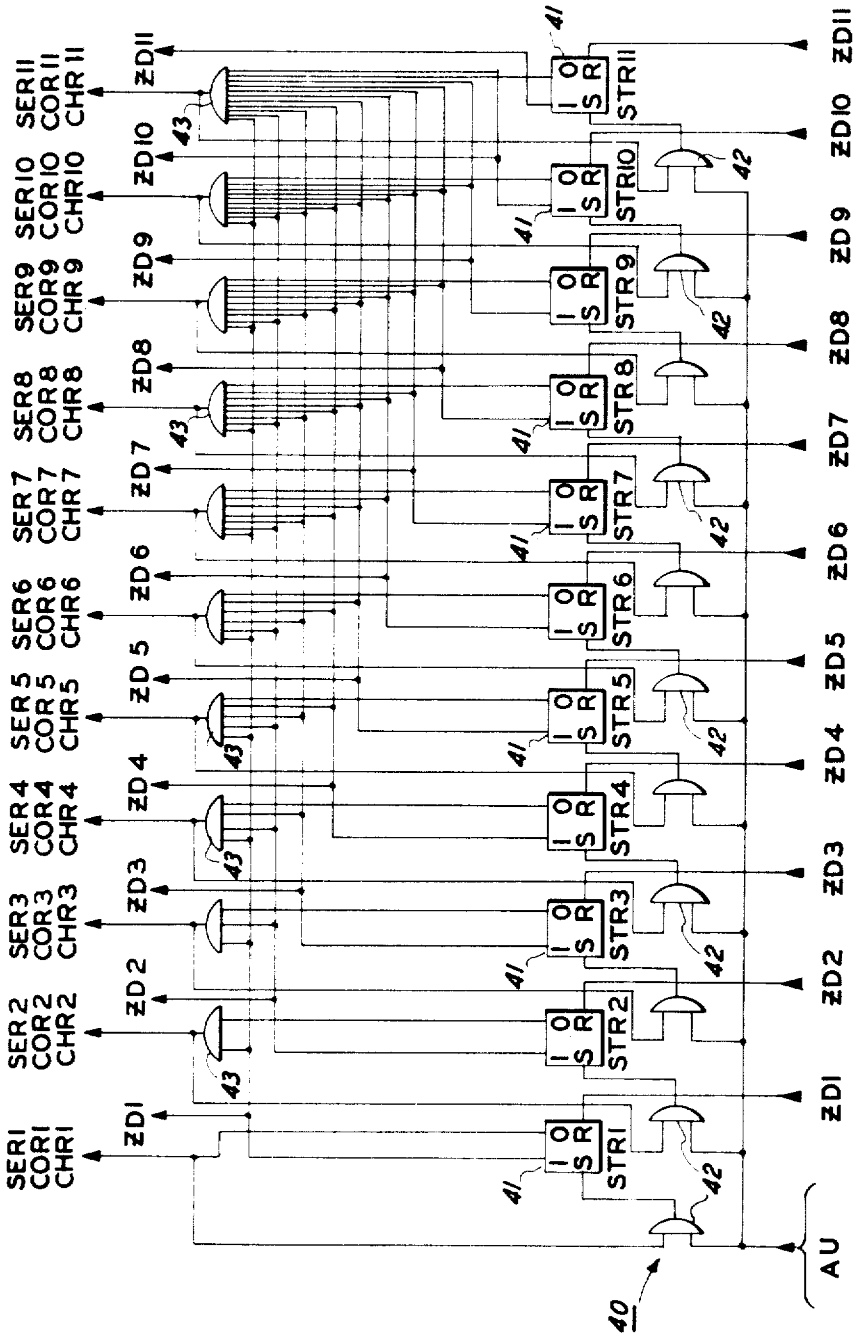
FIGURE 4 illustrates in schematic form the status register (STR) referred to in FIGURE 1 in accordance with the present invention.

Reference will now be made to FIG. 4 which illustrates in detail the circuit of the status register 40 referred to in FIG. 1. The status register comprises as many sections as the character register. In the preferred embodiment, it has eleven sections, designated STR 1 through STR 11, each section comprising mainly a flip-flop 41 and AND gate 42. One of the two inputs to the status register 40 is from the arithmetic unit 20 and is the gating signal which was described hereinabove as serving as an input to the adder circuit 27 and the adder circuit 28. As will be noted in FIG. 4 this input from the arithmetic unit serves as a common input to every one of the AND gates 42. However, the other input of these AND gates 42 is such as to always enable that gate which is associated with the lowest numbered section of the status register.

This is made possible by the connection of this input to the output of each status register section. In sections STR 1, this output is connected directly to the zero output of the flip-flop 41. In sections STR 2 through STR 11, this output is derived from an AND gate 43. This AND gate 43 monitors the set or one side output of each flip-flop 41 in the lower numbered sections and the reset or zero side output of the flip-flop with which the particular AND gate 43 is associated. In this manner, if the flip-flops in sections STR 1, STR 2, and STR 3 are in a set condition and the STR 4 flip-flop is reset, then the AND gate 43 associated with section STR 4 will be enabled thereby enabling the CHR 1 AND gates 33.

The gate pulse from the arithmetic unit 20 is utilized to set the lowest numbered section flip-flop 41 to indicate that its corresponding section of the character register was being used for storage as will be further explained hereinafter. Also, this setting of the flip-flop then effectively renders the AND gates 42 and 43 associated with the next higher section enabled while disabling the AND gate 43 and 42 associated with that section which received this gating pulse.

Therefore, the next gating pulse from the arithmetic unit 20 will set the STR 2 flip-flop assuming that the STR 1 flip-flop remains in its set condition. This sequence will be followed assuming that each set flip-flop remains in that condition until all eleven flip-flops have been set. However, if for any reason one of the preceding flip-flops is reset, then the next gating pulse will set that flip-flop once again before continuing the sequence toward the STR 11 section.

As noted in the discussion of FIG. 1, the status register of FIG. 4 has four outputs. The first three of these outputs are common to each other and originate from the output of the AND gates 43 in the status register with the exception of the STR 1 section where these outputs are derived directly from the zero output of the flip-flop 41. One of these three outputs goes to the character register 30, another to the column register 60, and the third to the segment register 12. The fourth output from the status register 40 originates from the one side of the flip-flops and is supplied to the zero detect circuit 50. The function of these outputs from the status register 40 will be explained in more detail hereinafter in connection with the discussion of the various circuits to which these outputs serve as inputs.

One output from the status register 40, as was noted before in connection with the discussion of FIG. 3, is applied to the character register 30. More particularly, the zero side of the flip-flops in the status register 40 are individually coupled to one input of the AND gates 33 associated with the sections of the character register 30. It is noted that the signal from the zero side of the flip-flops in section STR 2 through STR 11 pass through an AND gate 43 before reaching the AND gates 33 associated with the respective sections of the character register 30. Because of the nature of the circuit of the status register 40, the outputs from sections STR 2 through STR 11 may only be present during a fraction of the time in which the associated flip-flop is in its set condition. This may be appreciated when it is realized that the AND gates 43 associated with the various sections of the status register 40 are enabled or disabled depending upon the condition of the flip-flops in the preceding sections of the status register 40.

Figure 3:
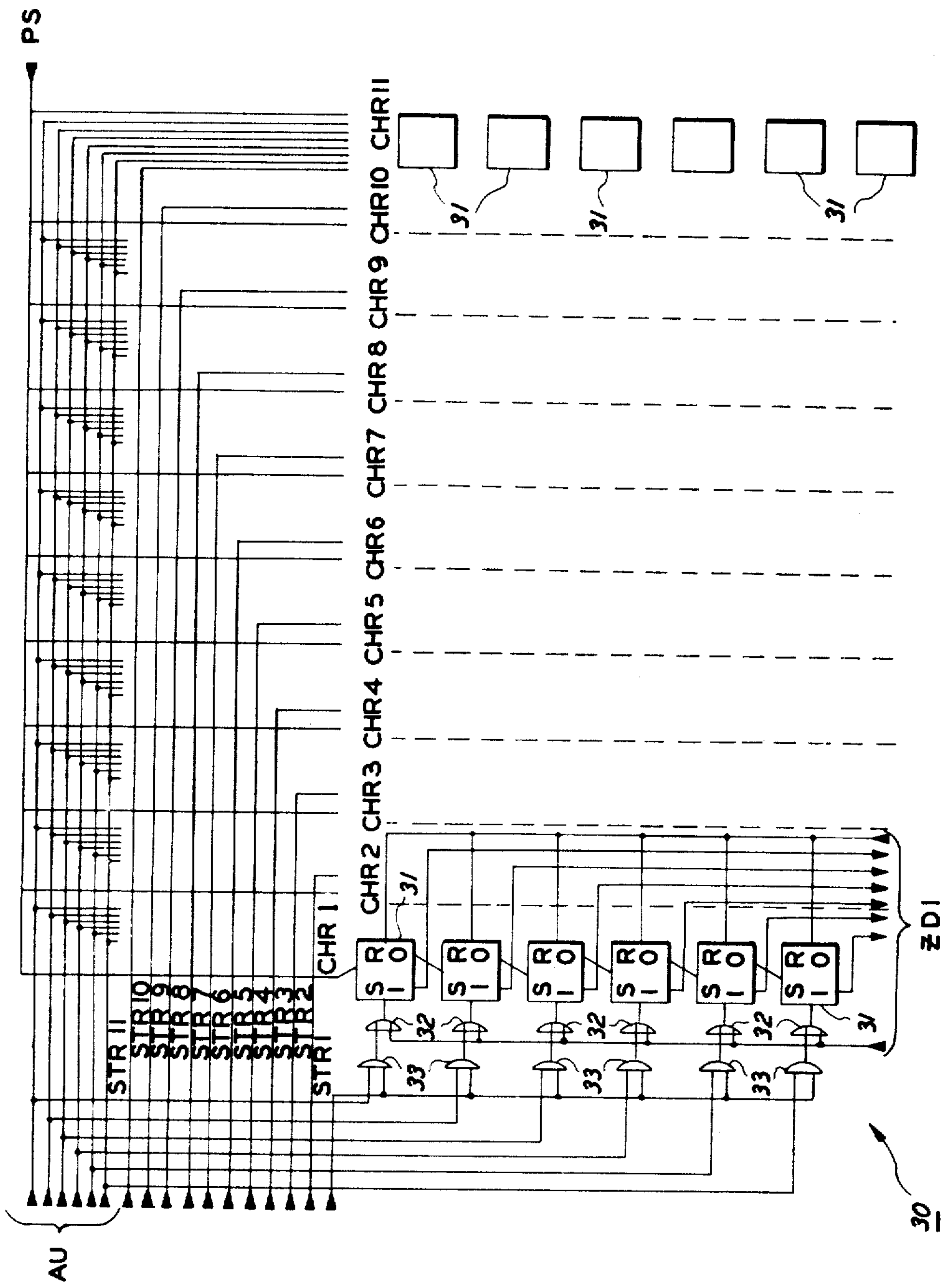
FIGURE 3 illustrates a partial schematic diagram of the character register (CHR) referred to in FIGURE 1 in accordance with the present invention.

Referring now to FIGS. 2, 3, and 4 it may be seen that as an information character is received by the arithmetic unit 20 of FIG. 2 and a binary signal is generated at the output of the arithmetic unit 20, a gating pulse is sent as a common input to each of the AND gates 42 of the status register 40 in FIG. 4. However, because of the nature of the logic circuitry in the status register 40, this gating pulse sets only the flip-flop in the STR 1 section. However, before the setting of this flip-flop, the zero side thereof is a normally high level signal. This high level signal is translated to the input of the AND gates 33 associated with section CHR 1 of the character register 30. This high level gating signal enables one of the two inputs to all the AND gates 33 of the CHR 1 section of the character register. The other inputs to these AND gates 33 are provided from the arithmetic unit 20 in the form of one of six bits of the aforementioned binary signal generated at the output of the arithmetic unit 20. Therefore, before the setting of the STR 1 flip-flop 41 in the status register 40, the binary signal generated at the output of the arithmetic unit 20 is gated in parallel into section CHR 1 of the character register 30. Also at this time, the other AND gates 42 and 43 in the remaining sections of the status register are disabled.

This binary number gated in parallel into section CHR 1 of the character register 30 will begin to be counted down or reduced by the decimal number 1 as each character space on the character belt 5 passes the position sensor 9 located at the reference position as referred to earlier in relation to FIG. 1. In FIG. 3, this counting down provision is illustrated by the input from the position sensor 9 to each of the eleven sections of the character register.

As was noted hereinabove in connection with the discussion of the arithmetic unit as illustrated in FIG. 2, the number ultimately generated by the arithmetic unit after a comparison of the contents of the result register 22 and the belt position counter 4 is representative of the number of character spaces on the character belt 5 at the time of the receipt of the information chaarcter by the high speed recording system through which the character corresponding to the desired information character to be recorded must pass before reaching the desired record column in the record zone. Therefore, as the contents of section CHR 1 of the character register approaches zero, the character corresponding to the desired information character to be recorded approaches the desired column in which it is to be recorded in the record zone.

It should be stated at this point that the particular section of the character register may very probably be counted down to zero before the actual character on the character belt reaches the desired column in the record zone. This is due to the fact that the number placed in this section of the chaarcter register is a function of the particular column in a segment and not a function of the specific column in the record zone.

When the six flip-flops in CHR 1 section of the character register in FIG. 3 reach zero coincidentally, i.e., are all in their original reset condition, then a zero detect circuit 50 will produce a signal indicative of this fact. This will be seen more clearly wth reference to FIG. 5 which illustrates partly the circuitry of the zero detect circuit 50 which monitors the contents of section CHR 1 of the character register 30, as well as the other ten sections thereof.

Figure 5:
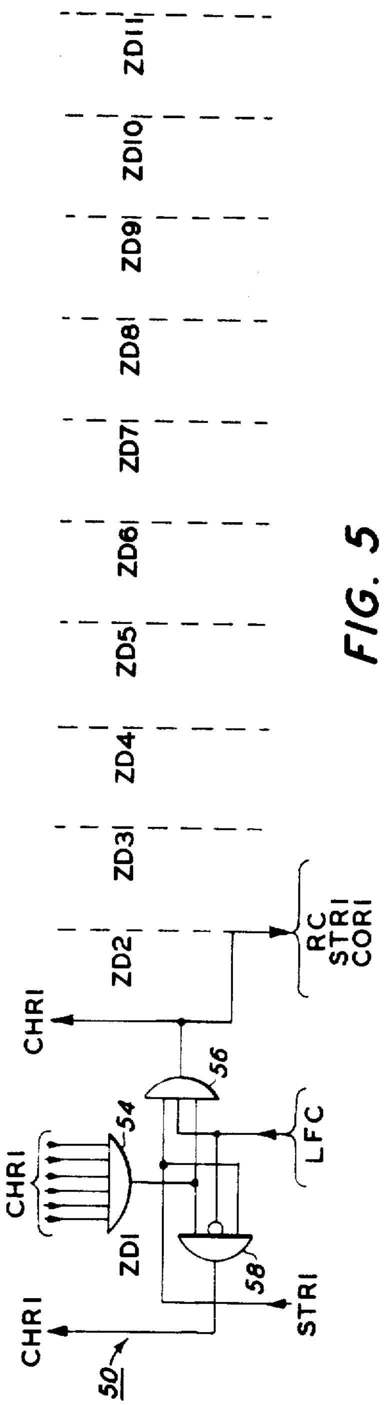
FIGURE 5 illustrates the zero detect circuit (ZD) referred to in FIGURE 1.

The zero detect circuit 50 referred to above in connection with FIG. 1 is illustrated in FIG. 5 as including eleven sections, ZD 1 through ZD 11, associated respectively with the eleven sections of the status register 40 as well as the character register 30. Each section of the zero detect circuit 50 includes three AND gates 54, 56, and 58. AND gate 54 monitors the six output conductors representative of the contents of the particular section of the character register with which this section of the zero detector circuit 50 is associated. In FIG. 5, section ZD 1 is illustrated in detail and shows AND gate 54 monitoring the six outputs from the flip-flops comprising section CHR 1 of the character register. The output of this AND gate 54 is supplied as one input to each of the other two AND gates 56 and 58. AND gates 56 and 58 are illustrated as having two other common inputs, namely from the first section or STR 1 section of the status register as well as from the line feed control circuit 13 referred to hereinabove in connection with FIG. 1. AND gate 56 will be enabled upon the coincidence of a gating signal from section STR 1 of the status register 40, a gating signal from the output of AND gate 54 indicating a zero contents condition in section CHR 1 of the character register, and the presence of a gating signal from the line feed control circuit indicating that the recording medium 7 is not in motion. When the AND gate 56 is enabled an output signal indicative of this condition is supplied to the reset input of the six flip-flops in section CHR 1 of the character register as well as to the record control circuit 8 referred to hereinabove in connection with FIG. 1.

This output from the AND gate 56 is also provided to the reset side of the STR 1 flip-flop in the status register 40 and to the reset side of the flip-flops in section COR 1 of the column register 60.

AND gate 58 in the ZD 1 section of the zero detect circuit 50 of FIG. 5 has three inputs similar to those of AND gate 56 as outlined in the preceding paragraph with the exception that the input from the line feed control circuit 13 is inverted before reaching this AND gate 58. This inversion of the line feed control signal allows the enabling of this AND gate 58 upon the coincidence of recording medium motion, a zero condition in section CHR 1 of the character register 30 and a gating signal from section STR 1 of the status register 40. This enabling of AND gate 58 produces an output signal which is translated to the set input of each of the six flip-flops 31 comprising section CHR 1 of the character register as shown in FIG. 3. This input from the output of AND gate 58 reaches flip-flops via OR gates 32 to set the contents of section CHR 1 of the character register to its maximum count, which in the example would be sixty-three.

In this manner, the maximum count of sixty-three would be counted down to zero as the desired character made a complete passage through the path taken by the character belt. When zero was reached again, the desired character would be in the same position it was previously when the recording medium was moving.

It can be observed that the output signals from AND gate 56 and 58 are mutually exclusive dependent upon the motive condition of recording medium.

The output from the AND gate 56 provides one of the two inputs to this record control circuit. The other input signal to the record signal to the record control circuit comes from a selector matrix 10. The generation of this input signal will be described in more detail hereinafter.

It should be noted that the inputs to the record control circuit 8 as illustrated in FIG. 1 are symbolic of a plurality of inputs. For example, the input shown originating from the zero detect circuit 50 symbolizes eleven inputs from the eleven sections of the zero detect circuit 50. Similarly, as will be explained in more detail hereinafter, the input to the record control circuit 8 from the selector matrix 10 symbolizes eightly individual inputs associated with the eighty transducers generally designated by the reference number 6 in FIG. 1 necessary to record in the eighty spaces alloted to a recording line.

As hereinabove noted in connection with the discussion of the block diagram of FIG. 1 one of the inputs to the record control circuit 8 which is directly connected to the selector matrix 10 originates initially at the column counter 3 and the segment counter 11. Reference will now be made to the column counter 3 and the column register 60 which are illustrated in FIG. 6.

The column counter includes basically a seven-stage binary counter which is driven by the pulses from a divider circuit 61 of conventional design which generates a pulse indicative of the reception at its input of eight successive pulses from a conventional clock generator 62 assuming that each information character is associated with eight binary bits. The frequency of the clock generator 62 corresponds with the bit frequency of the information received at the input terminal 1 of FIG. 1. It is well known in the art to synchronize a clock generator for this particular purpose with command signals accompanying the information signals to the high speed recording system.

After the clock pulses have been divided by eight, a pulse enters a number one into the column counter 3 according to well known principles of binary counters.

Figure 8:
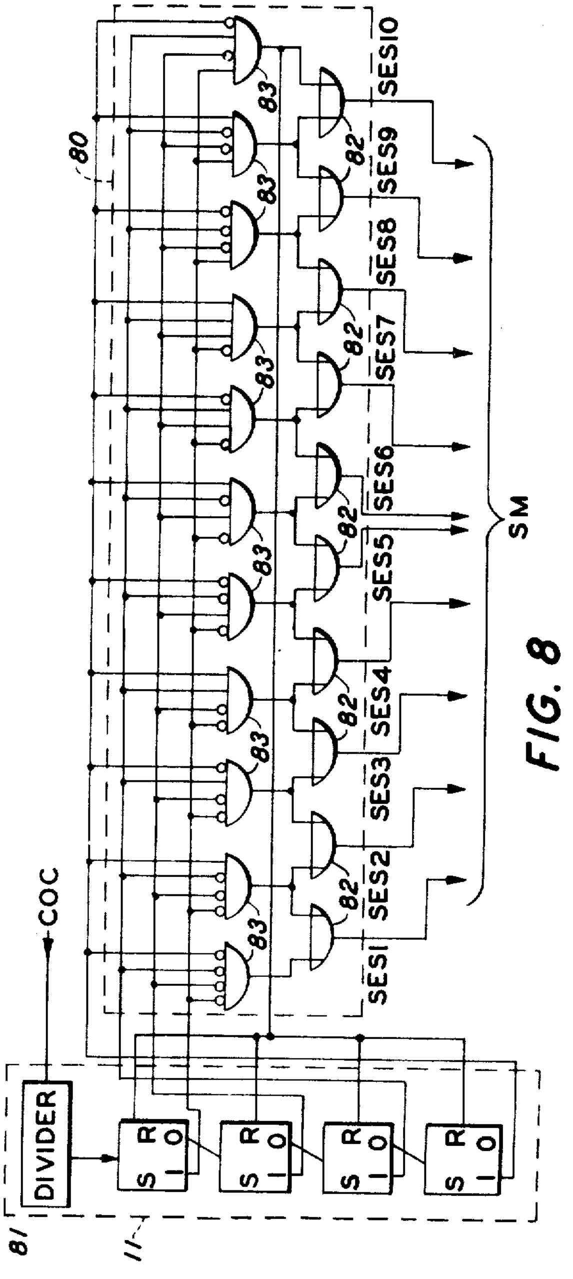
FIGURE 8 illustrates the segment counter (SEC) and segment selector (SES) referred to in FIGURE 1 in accordance with the present invention.

These pulses from the divider circuit 61 are also supplied to a segment counter 11 which will be referred to in more detail in connection with the discussion of FIG. 8.

As shown in FIG. 6, an AND gate 63 monitors the contents of the column counter 3 and generates an output signal indicative of an eight count in the column counter 3. This output signal is then translated back to the column counter to reset it to zero.

The first three stages of the column counter 3 which represent the three least significant bits of the binary number registered as the contents of this counter 3 are monitored by the eleven sections of the column register generally designated by the reference numeral 60. The eleven sections, designated COR 1 through COR 11, of the column register 60 each contain three flip-flops 64 which receive in parallel the contents of the aforementioned three stages of the column counter 3 in response to a gating signal from a corresponding section of the status register 40. Referring particularly to the section COR 1 of the column register 60 the three flip-flops will receive the three least significant bits from the column counter 3 in response to a gating signal to AND gates 65 from the output of section STR 1 of the status register. Accordingly the contents of the three least significant bit stages of the column counter 3 will be gated into the other ten sections of the column register 60 in response to appropriate gating pulses from corresponding sections of the status register 40. For example, when the first information character is received and processed by the arithmetic unit 20, section STR 1 of the status register will gate this processed binary number from the arithmetic unit 20 into section CHR 1 of the character register at the same time the output signal from section STR 1 of the status register 40 will also gate into the section COR 1 of the column register 60 the three least significant bits of the column counter 3 which will represent the desired column of a segment in which the desired information character is to be recorded.

As hereinabove stated, a pulse from AND gate 56 in the zero detect circuit 50 of FIG. 5 is supplied to the reset side of the flip-flops 64 for reset purposes.

The three outputs from each of the eleven sections of the column register 60 which are indicative of the contents thereof are monitored in turn by a column selector circuit 70, one section of which is illustrated in FIG. 7.

Reference will now be made to FIG. 7 which illustrates in detail one section of the column selector 70 as well as one section of the segment register 12 in addition to the block diagram of the selector matrix 10.

Section COS 1 of the column selector 70 is illustrated in FIG. 7. This section is one of eight sections designated COS 1 through COS 8. Each of these sections, as is illustrated in this figure, include eleven AND gates 71 which monitor the outputs from the eleven sections of the column register 60. This provides three inputs to each of the AND gates 71 in addition to a fourth input which is derived from the segment register.

This fourth input will be discussed in detail hereinafter in connection with the segment register 12.

Each of the outputs from the AND gates 71 in section COS 1 of the column selector are supplied as inputs to an OR gate 72. This OR gate 72 has its output connected to the first column input of the selector matrix 10. Accordingly sections COS 2 through COS 8 of the column selector have their outputs connected respectively to the other column inputs of the selector matrix. As may be seen in FIG. 7 some inputs to the various AND gates 71 of section COS 1 of the column selector 70 are supplied via inverters. In this manner, each AND gate 71 in section COS 1 of the column selector monitors the contents of the eleven sections of the column register for a binary signal representative of the decimal number one. When any of the sections of the column register 60 have a contents indicative of a decimal number one, then an output signal will be supplied to the column one input of the selector matrix through the OR gate 72 of the section COS 1 of the column selector. It is assumed that the input from the segment register 12 is in an enabled condition. Similarly, section COS 2 of the column selector monitors the eleven sections of the column register for the decimal number two and so on for the remaining six sections of the column selector 70.

Referring still to FIG. 7, the segment register 12 may be seen as including eleven sections, designated SER 1 through SER 11, each section of which includes a flip-flop 74 in each of the sections serves as the fourth input to the AND gates 71 and the column selector. For example, the output from section SER 1 serves as a common input to each of the AND gates 71 in section COS 1 of the column selector.

The AND gates 76 associated with each section of the segment register each have two inputs. One of these inputs is supplied by an appropriate section of the status register 40. For example, one input to the AND gate 76 associated with the SER 1 section is provided from the output of section STR 1 of the status register 40 discussed hereinabove. The other input to this AND gate 76 is provided from the fourth least significant bit stage of the column counter which is the fourth stage thereof. This was noted in the discussion of FIG. 6. The output of the AND gate 76 is provided alternatively to the set input or reset input of its associated flip-flop 74 in that section of the segment register. However, at the reset input, this output passes through an inverter before direct application to the flip-flop 74. In this manner, the flip-flop will be set or reset depending upon its condition prior to the receipt of the output pulse from the AND gate 76 as seen in section SER 1. Therefore, each time the condition of the fourth stage of the column counter changes, assuming it is initially in a reset condition, the flip-flop then monitoring this stage of the column counter will change its state. When the role of the fourth stage or the fourth least significant bit of the binary number registered in the column counter is considered, the state of the fourth stage of this counter 3 will be indicative of an odd or even number of segments of character information which have been received by the high speed recording system. For example, since the initial state of the column counter is zero, the state of the fourth flip-flop thereof will be in a reset condition. In other words, the fourth least significant bit will be a binary zero. Since the fourth least significant bit in acknowledged binary number theory represents the decimal number eight, for each eight columns counted by the column counter the state of this fourth stage will change accordingly. Therefore, after eight columns have been counted, the state of this stage will be a binary one. Similarly, after the first sixteen columns have been counted, this stage will represent a binary zero once again.

The function then of the segment register 12 is to monitor the fourth stage of the column counter or the fourth least significant bit in the binary number registered in the column counter 3. In this way, the segment register 12 will be able to indicate whether or not a particular information character received by the high speed recording system of the present invention is to be recorded in the specified column of the segment currently then being recorded or in the next successive segment. For example, assume that the first segment is being recorded and the recording system is then presently recording the sixth column. If the character information to be recorded in the second column of this first segment has already been recorded then this storage section of the character register may be available to receive an additional information character. However, this information character may correspond to the first column of the second segment. Therefore, although the character register may have counted down to zero, it is necessary to indicate to the record control circuit 8 that this first column in which the desired character information is to be recorded is not in the first segment but is in the next following segment or the even segment. Therefore the selector matrix will not be energized for the first column until the recording system has turned to the second segment. This will be more clearly seen in a summary of the operation of the entire high speed printing system which will follow hereinafter.

Still referring to the illustration of FIG. 7, it may be seen that the selector matrix generally designated by the reference numeral 10 has ten segment inputs which are indicated as coming from ten sections of a segment selector 80. The segment selector is illustrated in more detail in FIG. 8.

Referring now to FIG. 8 it may be seen that in addition to the segment selector 80, the segment counter 11 is also illustrated.

The segment counter 11 itself includes a four stage conventional binary counter having an input from a conventional divider circuit 81 which receives pulses from the divider circuit 61 referred to hereinabove in the connection with the column counter 3. The divider circuit 81 in the segment counter 11 divides the pulses indicative of columns by eight and generates a pulse indicative thereof to drive the segment counter.

Due to the fact that the recording system may be recording in two segments at the same time, it is necessary that the segment selector 80 be so designed as to monitor pairs of successive segments. As may be seen in FIG. 8 the segment selector includes ten sections, designated SES 1 through SES 10. Each of these sections has an output which corresponds to a particular segment input on the selector matrix 10 as referred to hereinabove in connection with FIG. 7. Each section of the segment selector 80 includes an OR gate 82 which monitors the outputs of two AND gates 83. The AND gates 83 have a designated order of inverters at their inputs in order to monitor the contents of the segment counter for a particular segment number. The OR gate associated with section SES 1 of the segment selector monitors the segment counter for the decimal numbers zero and one, respectively. Similarly, the OR gate associated with the section SES 2 monitors two AND gates which are enabled upon the registering of the decimal number one and two in the segment counter 11. This same sequence is followed through all the sections of the segment selector down to section SES 10 which monitors the outputs of two AND gates which are enabled upon the presence of decimal number nine and ten, respectively, in the segment counter 11. The output from that AND gate associated with section SES 10 which is enabled upon the presence of the decimal number ten also is utilized to reset the segment counter from ten to zero in preparation for a new line of character information to be recorded.

From the discussion in the above paragraph, it may be seen that when the segment counter indicates a particular segment is being recorded, an appropriate output signal is supplied from the segment selector 80 to the proper input of the selector matrix 10. Upon the coincidence of this output signal to the selector matrix 10 and another output signal from the column selector 70 to an appropriate column input of the selector matrix, a desired segment and column therein is selected and an output signal indicative thereof is translated to the record control circuit 8 to permit a signal indicative of the zero detect function in the character register to energize the appropriate one of eighty record transducers to make the recording of the desired character at the desired record column.

Having reviewed the block diagram of FIG. 1 and the detailed circuitry of some of the blocks thereof in FIGS. 2–8, it may be helpful to review an operation of the overall system at this time.

For purposes of this description of the operation of the high speed recording system of the present invention, it may be assumed that an unrecorded area of the recording medium 7 has been presented in the record zone by line feed control 13 and feed drive 14. Also it may be assumed that the character belt 5 is now moving through the record zone intermediate the record transducers 6 and the recording medium 7 at a uniform rate in accordance with the motive power generated by the drive source 15 and translated to the drive pulley 16 via a suitable mechanical linkage 17. A serial array of character information in the form of six binary bits are received at input terminal 1 of the high speed recording system. It is assumed that any additional bits associated with this first character information has been separated from the aforementioned six bits comprising the character word. These additional bits may be parity bits or instructional bits to initiate the operation of the clock generator 62 in the column counter 3.

If necessary the six bit character may be translated by the code translator 2. From the code translator the information is passed to a data register 18 which effectively converts it from serial to parallel binary information. Upon completion of this conversion, a signal is supplied to the arithmetic unit 20, and more particularly, to a delay circuit 19 and an adder circuit 21, both shown in FIG. 2. The adder circuit 21 and the arithmetic unit 20, upon receipt of the signal indicating the completion of the conversion in the data register 18, will add the contents of the data register 18 or the binary code of the character to be recorded with the three least significant bits in the column counter 3.

Let it be assumed for purposes of this description that the charatcer to be recorded corresponds with the tenth character in the character pattern on the character belt 5, and the column in which it is to be recorded is the first column of the first segment.

Therefore, the adder circuit 21 and the arithmetic unit 20 will add the data register contents which is the decimal number ten and the three least significant bits of the column counter which at this point in time would be the decimal number 1. This summation will then be the decimal number eleven. After the adder circuit has completed this addition, its contents are translated to the result register 22 for future utilization.

At the time of receipt of the binary coded character by the high speed recording system, it may be assumed again for purposes of this description that the belt position counter 4 has registered the number four indicating that, at the time the character information was received by the high speed recording system, the fourth character in the character pattern on the belt 5 was located at the reference position opposite the position sensor 9 which is positioned in the character space immediately preceding the record zone. This number four is translated from the belt position counter 4 to the arithmetic unit 20 and is compared with the contents of the result register by the comparator circuit 23. In this example, the comparative circuit 23 will detect that the contents of the result register 22, viz., the number eleven, is greater than the contents of the belt position counter 4, viz., the number four. As a result of this determination, a gating signal will be generated by the comparator circuit 23 and translated via an output conductor 26 to an adder circuit 27. In addition to this gating signal from the delay circuit 19 will also be supplied to adder circuit 27. Upon the coincidence of these two gating signals at the adder circuit 27, this circuit will add the complement of the contents of the result register, viz., the number fifty-two, and the contents of the belt position counter, viz., the number four. The result of this summation will be the number fifty-six, the complement of which will be translated through an OR gate 24 in the arithmetic unit 20 to the character register 30.

Coincidentally with the summing operation of the adder circuit 27, the gating pulse from the delay circuit 19 is supplied to one input of the status register 40 as indicated in FIG. 4. This input is passed by the only enabled gate 42 in the status register. This gate is associated with section STR 1 of the status register. When this gating pulse is passed by the AND gate 42, it accordingly sets flip-flop 41 in section STR 1. Prior to this, however, the zero side of this flip-flop, a high level signal is supplied to the AND gate 33 associated with the section CHR 1 of the character register 30 in FIG. 3. This high level signal from section STR 1 of the status register enables one input of each of the AND gates 33 in this section of the character register 30. By enabling this input of the AND gates 33, the six binary bits resulting from the summation in the adder circuit 27 are loaded into section CHR 1 of the character register via the OR gate 24 in the arithmetic unit 20, and the AND gates 33 and OR gates 32 associated with this section of the character register.

At this point in the operation of the high speed recording system in accordance with the present invention, the section CHR 1 will now contain a binary number corresponding to the decimal number seven which corresponds to the complement of the number resulting from the addition in the adder circuit 27 of the arithmetic unit.

While the character register section CHR 1 is being loaded with the binary number processed by the arithmetic unit 20, the column counter 3 in FIG. 6 has been indexed one unit to correspond to column one in which the received information character is to be recorded. This number one is loaded in a parallel manner into the column register 60, more particularly, into section COR 1 of the column register upon the receipt by AND gates 65 of a gating pulse from the zero side of flip-flop 41 in section STR 1 of the status register 40. Therefore, the particular column in which the received character is to be recorded is stored in section COR 1 of the character register.

Immediately following the loading of the processed binary number into section CHR 1 of the character register, this number is counted down or reduced by one for each character space which the position sensor 9 detects passing the reference position. Therefore, when seven character spaces pass this reference position, the contents in section CHR 1 of the character register reach zero.

This condition will be detected by AND gate 54 in the zero detect circuit 50 as illustrated in FIG. 5. The signal generated by AND gate 54 is applied as one of three inputs to AND gate 56 in the zero detect circuit. The other two inputs of this AND gate 56 will also be enabled at this time. One of these inputs is from the one side of the flip-flop 41 in section STR 1 of the status register which indicates to AND gate 56 that the signal from AND gate 54 denotes that a number previously placed in section CHR 1 of the character register has reached zero. The other input or third input to AND gate 56 is from the line feed control circuit 13. Since the recording medium is in a recording position and therefore not moving this input to AND gate 56 will also be enabled.

Consequently, AND gate 56 will produce a signal which is translated directly to the record control circuit 8. This signal from the output of AND gate 56 is also supplied to the STR 1 section of the status register to reset flip-flop 41 therein and also to section COR 1 of the column register to reset flip-flops 64 associated therewith.

However, before section COR 1 of the column register is reset, its contents have been monitored by section COS 1 of the column selector 70.

The column selector, shown in FIG. 7, monitors section COR 1 as well as the other eleven sections of the column register and detects the number one in any of these sections of the column register. However, in this particular situation, it detects the number one in section COR 1 and passes an output signal indicative of the detection of this number in the column register through an OR gate 72 to the column one input of the selector matrix 10 thereby energizing this input.

It is understood that the SER 1 section of the segment register 12 has remained unchanged so that its associated input to AND gate 71 of the column selector is enabled.

While this is being done, the segment counter 11 illustrated in FIG. 8 has also received a pulse from the column counter and has stored a count indicative of the first segment. This count is monitored by the segment selector 80 by way of appropriately arranged AND gate 83. Since a first segment has not been completed, the first AND gate 83 to the left, as the figure is viewed, detects a zero condition in the segment counter 11 and generates a signal indicative of this condition which is passed by OR gate 82 to the selector matrix 10.

Referring now to FIG. 7 it is seen that section SES 1 of the segment selector energizes the segment one input of the selector matrix. With the coincidence of a signal at the column one input as well as at the segment one input, a particular single output out of eighty possible outputs has been selected and is indicative of the first column of the first segment. This output signal is translated to the record control circuit 8.

Upon the coincidence of this particular input to the record control circuit 8 from the selector matrix 10 and the output from the AND gate 56 in the zero detect circuit 50, a particular single input to the record transducers 6 is energized and a particular transducer associated with this input is actuated to record the character on the character belt 5 which is at this position in the record zone. In the example, this character will be the tenth character in the character pattern on the character belt 5.

This completes one recording operation by the high speed recording system of the present invention. The next succeeding information character received at the input terminal 1 of this system will be treated in a very similar manner depending upon the character to be recorded and the position of the character belt 5 at the time of the reception by the high speed recording system of the character information.

It may occur that the next successive character information arrives at the input terminal 1 before the number in the CHR 1 section of the character register 30 reaches zero. If such is the case, then this character information is processed by the arithmetic unit 20 and the resulting binary number will be loaded into section CHR 2 of the character register in cooperation with sections STR 2, COR 2, COS 2, SER 2 and SES 2 of the subsystems already described and in a similar manner as hereinabove stated.

While the invention has been described with reference to the circuit disclosed herein, it is not confined to the details set forth since it is apparent that electrical equivalent components may be substituted for the components of the preferred circuit without departing from the scope of the invention. Thus, for example, while the storage in the various registers utilizes bistable devices such as flip-flops, a ready alternative could be a magnetic core storage system.

In the preferred embodiment, the sections of the character register are counted down to zero. However, these sections could just as readily be counted up to their maximum count of sixty-three while the number inserted therein in the preferred embodiment would, in this alternative, be the complement of that number.

In the arithmetic unit 20, three conventional adder circuits are illustrated. It should be understood that the operations performed by these three adder circuits could be equally performed by only one adder circuit.

Similarly, the segment counter could receive its driving pulse from the fourth least significant bit stage of the column counter instead of the arrangement illustrated in FIG. 8.

In addition, although the character register in the preferred embodiment has eleven sections, it may be readily understood that any number of sections may be utilized in accordance with the concept of the present invention as long as the number is not less than the number of columns per segment. The number of sections in excess of eight in the character register (and other associated registers) are utilized primarily as a buffer store during line feed time. If the feed time is such as to require less time then only nine sections of the character register would be needed. On the other hand, if a longer buffer time is desired between recording lines, the number of sections in the character register 30 may be increased to fourteen, for example.

Similarly, while a recording zone has been described as having eighty columns subdivided into ten segments, it should be understood that this zone may have $m$ number of columns subdivided into $n$ segments where $m/n$ is an integral number.

While one alternative of the recording medium 7 has been disclosed as a xerographic member, it should be understood that a photographic recording medium or any other light sensitive medium could be used with equal effect.

Also, while a photocell and light source has been disclosed for detecting passage of characters through a reference position prior to the record zone, a microswitch arrangement could also be used as well as a magnetic pickup arrangement.

It should also be understood that while a direct connection is indicated between the sections of the character register 30 and the position sensor 9, the pulses from the sensor 9 which are used to count down the contents of a section of the character register are actually selectively gated to a particular character section or sections in response, for example, from a gating signal taken from the output of AND gate 56 in the zero detect circuit 50. In this manner, the contents of those sections not then being used are unchanged from their initial conditions.

This application is therefore intended to cover such modifications or changes as may come within the scope of the invention as defined by the following claims.

What is claimed is:

1. A high speed recording system comprising:

(a) an array of $m$ number of electrically actuatable transducers;

(b) a record zone defined by the space adjacent said array of transducers;

(c) an endless belt bearing at least one predetermined pattern of $q$ number of alphanumeric characters;

(d) drive means for moving said endless belt through said record zone and said alphanumeric characters in cooperable relation with said transducers;

(e) belt position sensor means for generating a position signal as each of said alphanumeric characters pass a reference point relative to said record zone;

(f) a character information terminal adapted to receive groups of binary character information indicative of desired alphanumeric characters to be recorded;

(g) multi-stage column counter means having an initial condition for registering a column count indicative of the number of said groups received at said character information terminal, said column counter means including a reset means for resetting said column count to said initial condition when said count equals $m/n$ where $n$ is an integral number less than $m$ and such that $m/n$ is an integral number;

(h) segment counter means having an initial state coupled to said column counter means for registering a segment count indicative of the number of times that the number of said groups received at said input terminal equals $m/n$, said segment counter means including a reset means for resetting said segment count to said initial state when said count equals $n$;

(i) belt position counter means having an initial count condition coupled to said belt position sensor means and responsive to said position signal for registering a count for each of said position signals, said belt position counter means including reset means for resetting said belt position counter means to said initial count condition when said count equals $q$;

(j) arithmetic unit means coupled to said input terminal, said column counter means, and said belt position counter means for generating an instantaneous binary number which is a function of the instantaneous binary character information at said character information terminal and the instantaneous counts registered by said column counter means and said belt position counter means and a status signal indicative of the generation of said binary number;

(k) character register means coupled to said arithmetic unit means including $p$ number of character sections where $m/n \leq p < m$, each of said sections having an initial content condition, count reduction terminals and output terminals and responsive to a gating signal to receive in parallel said instantaneous binary number from said arithmetic unit means;

(l) column register means coupled to said column counter means including $p$ number of column sections, each of said sections having an initial content condition and output terminals, and responsive to a gating signal to receive in parallel said column count from said column counter means;

(m) segment register means coupled to said column counter means and having $p$ number of segment sections, each segment section having an output terminal and being responsive to a gating signal to receive a binary bit from a preselected stage of said column counter means;

(n) status register means for generating said gating signal in response to said status signal, said status register means including (1) a predetermined sequence of $p$ number of status sections having an initial first condition and, (2) intercoupling means among said status sections for effecting a second condition in any particular one of said status sections in response to the coincidence of said status signal and said second condition in the status sections preceding said particular one of said status sections in said predetermined sequence, said gating signal being generated in a status section during the coincidence of said second conditon in the status sections preceding the status section in which said gating signal is generated and said initial first condition in the status section in which said gating signal is generated;

(o) coupling means coupled intermediate each of said status sections and a respective section of said column register means, said character register means, and said segment register means for coupling said gating signal to said column register means, said character register means, and said segment register means;

(p) detector circuit means having $p$ number of detector sections each coupled to a respective section of said character register means and said status register means for generating a detect signal upon coincidence of said initial count condition and said second condition;

(q) column selector means coupled to said column register means and said segment register means for selectively generating a column signal in response to a predetermined column count;

(r) segment selector means coupled to said segment counter means for selectively generating a segment signal in response to a predetermined segment count;

(s) selector matrix means responsive to said column and segment signals for generating a segment/column signal; and (t) record control means coupled to said array of transducers and responsive to said segment/column signal and said detect signal for actuating a particular one of said transducers.

2. In a high speed recording system, the combination comprising:

(a) an array of $m$ number of record transducers;

(b) a record zone defined by the space adjacent said transducer array and divided into $m$ columns which are subdivided into $n$ segments;

(c) at least one predetermined pattern of alphanumeric characters supported on an endless belt;

(d) drive means for moving at a uniform rate said alphanumeric characters into a cooperable relation with said transducers in said record zone;

(e) belt position sensor means for generating a position signal as each of said characters pass a predetermined reference point;

(f) an input terminal adapted to receive binary character information indicative of a desired alphanumeric character to be recorded;

(g) circuit means coupled to said input terminal and said belt position sensor means for generating a binary number as a function of the desired alphanumeric character to be recorded, the column position at which it is to be recorded, and the position relative to said reference point of the character on said belt corresponding to said desired alphanumeric character;

(h) storage register means consisting of $p$ number of storage sections where $m/n \leq p < m$ for storing said binary number;

(i) means coupled intermediate said storage sections and said belt position sensor for incrementally reducing said binary number stored in said storage register means in response to said position signal; and (j) detect means coupled to said storage register means for generating a detect signal when said binary number is reduced to a predetermined level; and (k) control means for actuating one of said transducers in response to said detect signal.

3. A combination as defined in claim 2 wherein said storage register means includes (a) character register means having $p$ number of character sections, each character section having an initial condition and responsive to a gating signal for receiving said binary number; and, (b) status register means, having $p$ number of bistable status sections in a predetermined sequence for generating said gating signal in one of said status sections when said one status section is in a bistable state different from the status section preceding it in said predetermined sequence; and, (c) means for coupling each of said status sections to a respective character section.

4. A combination as defined in claim 3 wherein each of said character sections includes (a) a plurality of cascade-coupled flip-flops each having a parallel input and output terminal; and, (b) coupling circuit between said output terminals and said detect means.

5. A system as defined in claim 3 wherein said detect means includes $p$ number of detect sections, each detect section coupled to a respective character section and including AND gate means for generating said detect signal when said binary number in a particular character section reaches said initial condition in coincidence with a predetermined bistable condition in said particular character section's respective status section.

6. In a high speed recording system, the combination comprising:

(a) an array of $m$ record transducers responsive to the coincidence of a record signal and a detect signal defining a record zone divided into $n$ record segments which are subdivided into $m/n$ record columns;

(b) a belt supporting a predetermined pattern of transducer-responsive alphanumeric characters;

(c) drive means for moving said characters at a uniform rate through said record zone;

(d) belt position sensor means for generating a position signal in response to the movement of one of said alphanumeric characters pass a reference point;

(e) an input data terminal adapted to receive serial binary character information representative of a desired alphanumeric character to be recorded at a particular record segment and record column thereof;

(f) circuit means coupled to said input terminal for determining and generating the desired record segment signal and record column signal corresponding to received character information;

(g) selector means responsive to said record segment and record column signals for supplying said record signal to one of said $m$ transducers corresponding to the desired record segment and column of said record zone;

(h) arithmetic unit means responsive to said binary character information, said position signal, and said record column signal for generating binary number as a function of the desired alphanumeric character information to be recorded, the record column at which said character information is to be recorded, and the position of the character on said character belt corresponding to the character information to be recorded;

(i) character register means coupled to said arithmetic unit means and responsive to a gating signal for storing said binary number, said character register means having $p$ number of character sections, where $m/n \leq p < m$, each of which has an initial condition;

(j) $p$ number of status register sections coupled together in a predetermined sequence, each status register section associated with a respective character section and including an output terminal, an AND gate having two inputs and an output, and a flip-flop having a set and reset input capable of two stable states, and further including an electrical connection between said output terminal and one of said AND gate's inputs and between said AND gate's output and said set input, each of said status register sections further including circuit means for generating said gating signal at said output terminal upon the coincidence of one of said stable states in the status register sections preceding a particular status register section in said predetermined sequence and the other of said stable states in said particular status register section;

(k) control circuit means for generating a status signal at the other input of said AND gate in response to said generation of said binary number in said arithmetic unit means;

(l) coupling circuit between the output terminal of each of said status register sections and a respective character section;

(m) count down means coupled between said belt position sensor means and said character register means and responsive to said position signal for incrementally reducing said binary number toward said initial condition;

(n) detector means having a detect section corresponding to each of said character sections for generating a detect signal when said binary number is reduced to said initial condition; and, (o) coupling means for coupling said detect signal to said transducers.

7. A combination as defined in claim 6 further including:

(a) reset coupling means for coupling the output of each detect section to the reset input of the flip-flop in its corresponding status register section; and (b) interconnecting circuit means for generating a signal indicative of said one stable state in each status register section to its corresponding detect section.

References Cited

UNITED STATES PATENTS

| | | | |
|---|---|---|---|
| 3,051,785 | 8/1962 | Harding | 178—23 |
| 3,058,415 | 10/1962 | Hoffmann | 101—93 |
| 3,060,432 | 10/1962 | Schwertz | 346—74 |
| 3,312,174 | 4/1967 | Cunningham | 101—93 |
| 3,348,212 | 10/1967 | Tubinis | 340—172.5 |
| 3,356,997 | 12/1967 | Propster | 340—172.5 |

WILLIAM B. PENN, *Primary Examiner.*